(12) United States Patent
Bierhuizen

(10) Patent No.: US 6,997,561 B2
(45) Date of Patent: *Feb. 14, 2006

(54) REDUCED FORM FACTOR PROJECTION SYSTEM

(75) Inventor: Serge J. A. Bierhuizen, Santa Rosa, CA (US)

(73) Assignee: InFocus Corporation, Wilsonville, OR (US)

( * ) Notice: Subject to any disclaimer, the term of this patent is extended or adjusted under 35 U.S.C. 154(b) by 75 days.

This patent is subject to a terminal disclaimer.

(21) Appl. No.: 10/887,004

(22) Filed: Jul. 7, 2004

(65) Prior Publication Data

US 2004/0257536 A1 Dec. 23, 2004

Related U.S. Application Data

(63) Continuation of application No. 10/417,246, filed on Apr. 15, 2003, now Pat. No. 6,793,342.

(51) Int. Cl.
*G03B 21/14* (2006.01)

(52) U.S. Cl. .................... 353/31; 353/101; 353/122
(58) Field of Classification Search ............. 353/31, 353/33, 34, 37, 100, 102, 122; 349/5, 7, 8, 349/9; 348/742, 743, 771
See application file for complete search history.

(56) References Cited

U.S. PATENT DOCUMENTS

| | | | |
|---|---|---|---|
| 5,597,222 A | * | 1/1997 | Doany et al. ............. 353/33 |
| 6,053,615 A | | 4/2000 | Peterson et al. |
| 6,139,156 A | | 10/2000 | Okamori et al. |
| 6,154,320 A | | 11/2000 | Itoh et al. |
| 6,461,001 B1 | * | 10/2002 | Okamori et al. ............ 353/102 |
| 6,547,396 B1 | * | 4/2003 | Svardal et al. ............... 353/8 |
| 6,646,806 B1 | * | 11/2003 | Bierhuizen ................ 359/618 |
| 6,669,345 B1 | * | 12/2003 | Yajima ...................... 353/38 |
| 6,793,342 B1 | * | 9/2004 | Bierhuizen ................ 353/31 |
| 2002/0122156 A1 | * | 9/2002 | Sawamura et al. .......... 352/81 |
| 2003/0128342 A1 | * | 7/2003 | Wada et al. ............... 353/102 |

FOREIGN PATENT DOCUMENTS

EP          0 395 156 A1    10/1990

\* cited by examiner

*Primary Examiner*—William C. Dowling
(74) *Attorney, Agent, or Firm*—Schwabe, Williamson & Wyatt, P.C.

(57) ABSTRACT

The invention includes a color projection system. System includes a light source, a first relay lens, disposed on a first optical path, optically coupled to the light source. System also includes a second relay lens, disposed in a second optical path, optically coupled to the first lens, the second optical path being of a predetermined vertical distance above the first optical path. The color projection system also includes a light management device, having a light entrance surface and a light exit surface, the light entrance surface optically coupled to the second lens along the second optical path, the light exit surface located on a third optical path, and the third optical path being substantially parallel to the first and second optical paths and being a predetermined distance below the second optical path. A projection lens may be optically coupled to the light exit surface of the light management device.

20 Claims, 3 Drawing Sheets

REDUCED FORM FACTOR PROJECTION SYSTEM

RELATED APPLICATION

This application is a continuation of U.S. application Ser. No. 10/417,246 filed Apr. 15, 2003 now U.S. Pat. No. 6,793,342 for REDUCED FORM FACTOR PROJECTION SYSTEM.

FIELD OF INVENTION

The present invention relates to the field of color projection system. In particular, the present invention provides a reduced form factor projection system.

BACKGROUND OF THE INVENTION

Advances in projection technology have decreased the physical size of projection systems, or more commonly, the form factor of projection systems. For example, a projection system utilizing microelectromechanical (MEMS) technology, such as digital micromirror devices (DMD™) or digital light processing (DLP) methods may have a relatively small form factor. However, utilization of MEMS technology can be costly because of the technical requirements associated with such small mechanical devices that may range in size of 14 square micrometers (i.e., manufacturing and controlling such small mechanical objects that may be arranged in an array of 750 000 micro mirrors may be cost prohibitive).

A technology utilized to address some of the issues associated with MEMS technology is the liquid crystal on silicon (LCOS) technology. The LCOS technology integrates liquid crystal technology and a metal oxide semiconductor (MOS) to result in a reflective projection system that offers high resolution, low cost, scalable to small sizes, and relatively easy to manufacture. However, in a projection system utilizing LCOS technology, sophisticated light management devices are employed, which may adversely affect the form factor of the projection system.

For example, a light management device may operate to process light, which may involve separating light into its various color components, polarizing, and recombining the various color components to form an appropriate image. An example of light management device, which may be referred to as an architecture, suitable for the LCOS projection system may be a ColorQuad™ architecture utilizing ColorSelect™ polarization filter technology by Colorlink, Inc. of Boulder, Colo.

The ColorQuad™ architecture selectively rotates the polarization of one color relative to its complement. Utilizing the ColorSelect™ polarization filter technology, including polarizing beamsplitter (PBS) cubes, the ColorQuad™ architecture facilitates high contrast displays by providing polarization integrity of color separation and recombination. Thus, projection systems that can improve over the prior art in utilizing LCOS technology while reducing the form factor are desired.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

An improved arrangement for a projection system to facilitate reduction of form factor is described. In the following description, various aspects of the invention will be described. However, one skilled in the relevant art will recognize that the invention may be practiced without one or more of the specific details, or with other methods, materials, components, etc. In other instances, well-known structures, materials, or operations are not shown or described in detail to avoid obscuring aspects of various embodiments of the invention. Similarly, for purposes of explanation, specific numbers, materials and configurations are set forth in order to provide a thorough understanding of the invention. Nevertheless, the invention may be practiced without the specific details. In other instances, well-known features are omitted or simplified in order not to obscure the invention. Furthermore, it is understood that the various embodiments shown in the figures are illustrative representations and are not necessarily drawn to scale.

The terms "comprising", "including", "having", and other terms of the like, as used in the application (in particular, the claims), are synonymous.

Reference throughout this specification to "one embodiment" or "an embodiment" means that a particular feature, structure, material, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, materials, or characteristics may be combined in any suitable manner in one or more embodiments.

For the purposes of describing the invention, light will be illustrated as straight lines. However, one skilled in the relevant art will appreciate that light may behave as waves or particles. Additionally, certain established principles of physics will not be described in detail, in particular, derivations of equations such as those describing the behavior of light will not be described in detail. However, relevant equations will be described but not derived. It should be appreciated by those skilled in the relevant art that light may be focused through one or more lenses; however, because of the nature of light, stray light is readily present in projection systems, particularly when reflections occur.

Accordingly, the concept of filtering and polarizing light will not be described in detail. However, for the purposes of the invention, the concept of reflecting light will be referred to in describing the invention.

Figure 1:
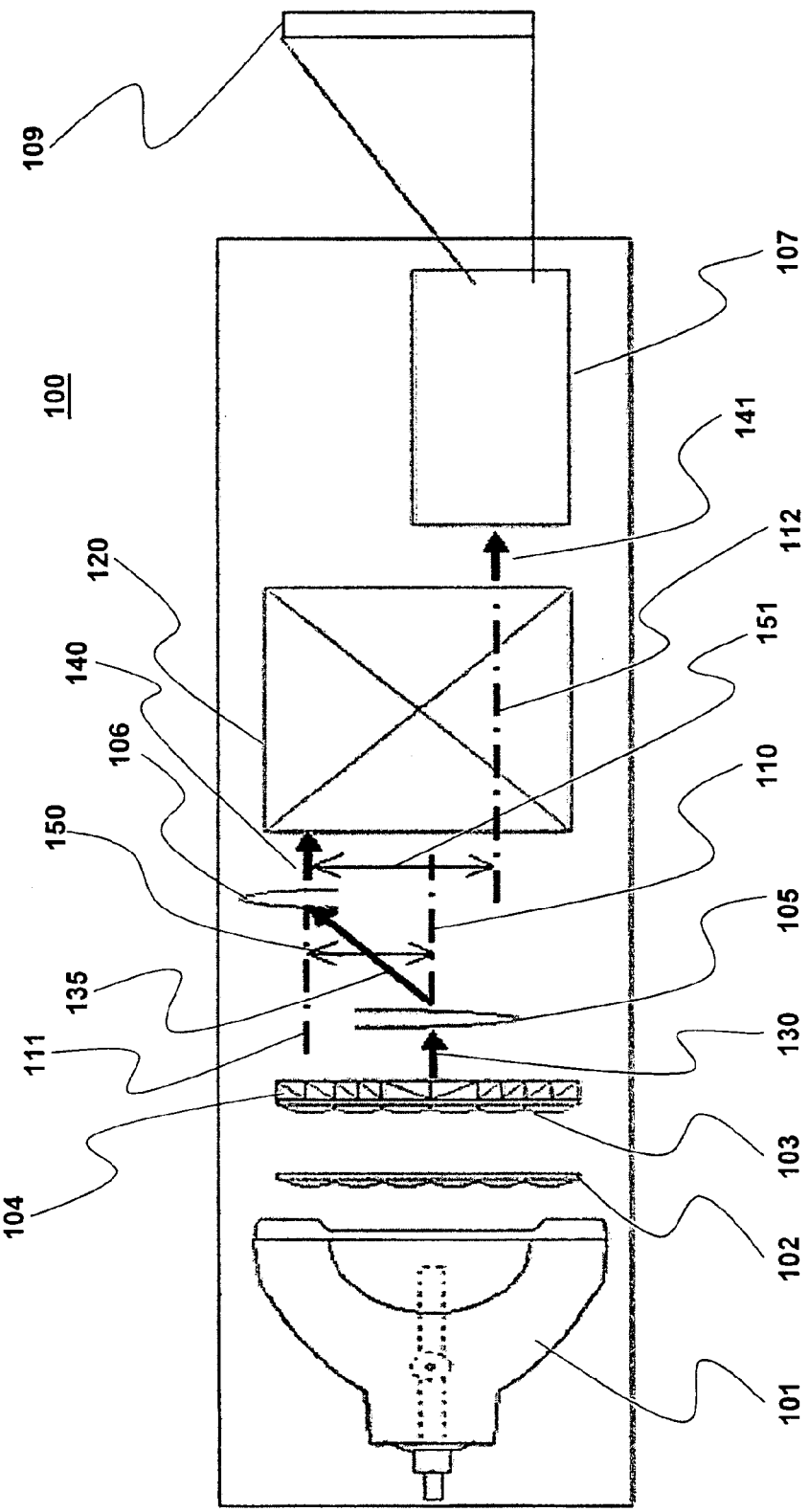
FIG. 1 illustrates diagrammatically an example of a color projection system having an arrangement to facilitate reduction of form factor, in accordance with one embodiment of the invention.

FIG. 1 illustrates diagrammatically an example of a color projection system having an arrangement to facilitate reduction of form factor, in accordance with one embodiment of the invention. Illustrated in FIG. 1, is a side view of a color projection system 100. The color projection system 100 can be a reflective color projection system, such as, but not limited to, a liquid crystal on silicon (LCOS) projection system. Color projection system 100 includes a light source 101. A first integrator plate 102 is disposed in a first optical path 110 between light source 101 and a second integrator plate 103. A polarization conversion system (PCS) 104 is disposed in the first optical path 110 between the second integrator plate 103 and a first relay lens 105. A second relay lens 106 is disposed in a second optical path 111 between first relay lens 105 and a light management device 120. The second optical path 111 being substantially parallel to the first optical path 110 and offset by a first predetermined vertical distance 150 above the first optical path 110. A projection lens 107 is disposed at the other or opposite side of the light management device 120 to receive processed light 141 from the light management device 120 at a third optical path 112. The third optical path 112 is substantially parallel to the first and the second optical paths 110–111 and offset by a second predetermined distance 151 below the second optical path 111. It should be appreciated by those skilled in the relevant art that light management device 120 may be referred to as a light management architecture; however, for the purpose of describing the invention, the light management device 120 will be referred to as light management device.

In the arrangement illustrated in FIG. 1, the light source 101 provides light 130, such as, but not limited to white light, to the projection system 100 in the first optical path 110. The first integrator plate 102 facilitates creation of multiple arc images of the light 130 at the second integrator plate 103. Due to the image of light 130, commonly being round, relay lenses 105 & 106 facilitate conversion of the light 130 to a substantially rectangular shape for illumination of a light valve (i.e., to substantially match the shape of the light valve). PCS 104 is disposed in the first optical path 110 between second integrator plate 103 and first relay lens 105 to facilitate conversion of light 130 into various polarized light.

As illustrated in FIG. 1, the first relay lens 105 may be an off-center lens, in accordance with an embodiment of the invention. That is, the first relay lens 105 receives the light 130 on the first optical path 110, and deflects the light 130 resulting in a first deflected light 135. The first deflected light 135 is focused by the first relay lens 105 to the second relay lens 106 that may be disposed on the second optical path 111. The second relay lens 106 may be also an off-center lens to facilitate reception and focusing of the deflected light 135 into the light management device 120 resulting in a second deflected light 140 on the second optical path 111. The second deflected light 140 is received by the light management device 120 and processed. Processed light 141 exits the light management device 120, at the third optical path 112, and is provided to the projection lens 107. In turn, the projection lens 107 facilitate projection of an image 109 as shown.

In the illustrated color projection system 100, light source 101 may be an arc lamp, such as but not limited to, a metal halide arc lamp, producing light 130. First integrator plate 102 may be any type to facilitate creation of multiple images of light 130 at the second integrator plate 103. PCS 104 may be of any type to facilitate conversion of light into polarized light such as, but not limited to, a PCS to facilitate conversion of light into linearly polarized light. Relay lenses 105–106 may be any type of off-center lenses such that the proper focusing is achieved based at least upon the first predetermined distance 150 between the first and second optical paths 110–111. Except for the advantageous and novel arrangement of the present invention, the general operation of relay lenses 105–106 are known, accordingly, will not be described in further detail.

The first predetermined distance 150 may be based at least upon the arrangement of the light management device 120. For example, the first predetermined distance have a dimension of 0.5 inches. Accordingly, the third optical path 112 may be based at least upon the type of light management device 120. For example, the second predetermined distance 151 may have a dimension of 1 inch. Additionally, the projection lens 107 may be any type, such as, projection lenses that facilitate reduction of keystone type distortions.

In various embodiments, the light management device 120 may advantageously include a light management device used to reduce stray light, such as the light management device described in co-pending U.S. patent application Ser. No. 10/417,245, titled "METHOD AND APPARATUS FOR REDUCING STRAY LIGHT IN A PROJECTION SYSTEM", filed Apr. 15, 2003, sharing at least a common inventorship and ownership as the present invention.

Before describing these elements in further detail, it should be noted that while for ease of explanation, the present invention is being described in the context of projection systems, however, based on the description to follow, a person skilled in the art will appreciate that the present invention may be adapted for other application besides projection systems.

As will be described in further detail below, the arrangement illustrated in FIG. 1, in particular, the arrangement of the relay lenses 105 & 106 and the light management device 120, results in compact and reduced form factor, in accordance with one embodiment of the invention.

Figure 2:
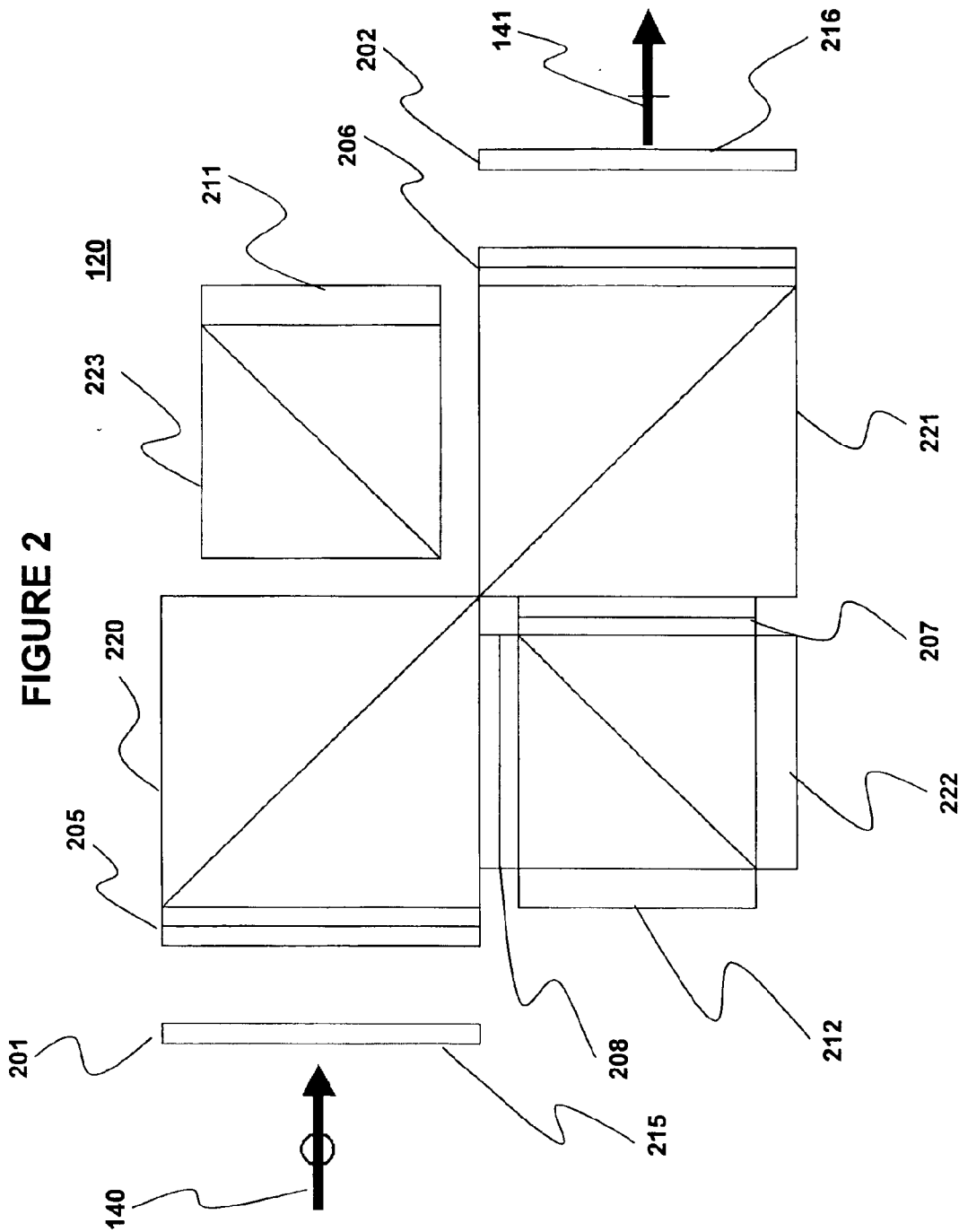
FIG. 2 illustrates an aspect of an arrangement for a projection system to facilitate reduction of form factor, in accordance one embodiment of the present invention.

FIG. 2 illustrates an aspect of an arrangement for a projection system to facilitate reduction of form factor, in accordance one embodiment of the present invention. In FIG. 2, light management device 120 is illustrated in further detail. Illustrated in FIG. 2, is a side view of the light management device 120 (shown in FIG. 1). In order to describe the invention, an overview of the various light management components and their arrangements, will be briefly described. Illustrated in FIG. 2, light management device 120 includes various light management components. Light management components can include a first and second polarizers 201–202, a first and second set of magenta and green (MG) filters 205–206, a first and second set of red and blue (RB) filters 207–208, a red liquid crystal on silicon (LCOS) display 210, a green LCOS display 211, and a blue LCOS display 212. Additionally, illustrated in FIG. 2, light management device 120 includes light management components to reflect light within the light management device 120, in particular, four polarizing beamsplitter (PBS) cubes 220–223 are optically coupled in a predetermined manner to facilitate reflection and transmission of light within light management device 120 to and from other various light management components 201–202, 205–208, and 210–212. The four PBS cubes 220–223 are referred to as cubes for ease of understanding the invention; however, the four PBS cubes 220–223 may be cube like. Alternatively, wire grid polarizers may be utilized as well.

As illustrated in FIG. 2, the predetermined manner in which light management components, polarizers 201–202, MG and RB filters 205–208, LCOS displays 210–212, and PBS cubes 220–223, are optically coupled, is a compact square shape (i.e., compact cubic shape). The compact square shape can be similar to light management device referred to as ColorQuad™ architecture from ColorLink, Inc. of Boulder, Colo. However, in FIG. 2, the four PBS cubes 220–223 may vary in size and shape. Even though, the first and second PBS cubes 220–221 may have identical size and the third and fourth PBS cubes 222–223 may have identical size and shape, the first and second PBS cubes 220–221 are larger than third and the fourth PBS cubes 222–223. Except for the novel arrangement of the light management device 120 in relation to the deflection of light 130 by off-center lenses 105–106, these light management components are known in the art, accordingly, will not be further described. However, as alluded to earlier, the light management device 120 may be of the type found that is illustrated in co-pending U.S. patent application Ser. No. 10/471,246, titled "METHOD AND APPARATUS FOR REDUCING STRAY LIGHT IN A PROJECTION SYSTEM", filed Apr. 15, 2003, sharing at least a common inventorship and ownership as the present invention.

In FIG. 2, the second deflected light 140 on the second optical path 111 is received by the light management device 120 at light entrance surface 215 on the second optical path 111 (shown in FIG. 1). The second deflected light 140 is processed within the light management device 120. The processed light 141 exits the light management device 120 at light exit surface 216. The processed light is then provided to the projection lens 107 (shown in FIG. 1).

Briefly referring back to FIG. 1, as illustrated, the second optical path 111 is substantially parallel to the first optical path 110 and offset by the first predetermined vertical distance 150 above the first optical path 110. Accordingly, the second relay lens 106 is disposed above the first relay lens 105. In order to receive the second deflected light 140 on the second optical path 111, light entrance surface 215 (shown in FIG. 2) may also be above the first optical path 110.

Referring now to FIG. 2, as illustrated in the side view of the light management device 120, the second deflected light 140 is received by the light management device 120 at the light entrance surface 215 located above the light exit surface 216, where the light exit surface 216 is on the third optical path 112.

Accordingly, a novel projection system utilizing multiple optical paths may be formed using off-center relay lenses 105–106 and light management system 120, arranged as illustrated, in accordance with the present invention. As a result, reduction of form factor of the projection system is facilitated.

Figure 3:
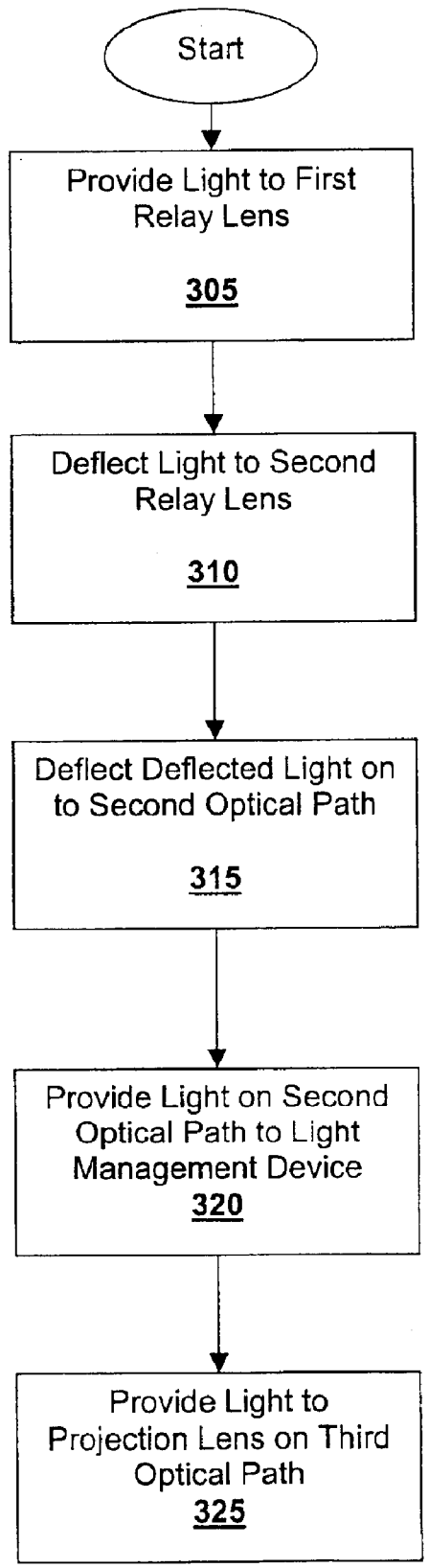
FIG. 3 illustrates operational flow for an improved arrangement for a projection system to facilitate reduction of form factor, in accordance with one embodiment of the present invention.

FIG. 3 illustrates operational flow for an improved arrangement for a projection system to facilitate reduction of form factor, in accordance with one embodiment of the present invention. Light from a light source is provided on a first optical path to a first relay lens, at operational block 305. The light is deflected to a second relay lens, at operational block 310. The second relay lens deflects the deflected light onto a second optical path, at operational block 315. At operational block 320, the deflected light on the second optical path is provided to a light management device.

The light management device has a light entrance surface located on the second optical path and a light exit surface located on a third optical path, the third optical path being substantially parallel to the first and second optical paths and being a predetermined distance below the second optical path.

At operational block 325, the light from the light management device is provided to a projection lens on the third optical path via the light exit surface. Thus, novel arrangements for a projection system to facilitate reduction of form factor utilizing multiple optical paths have been described. While the methods and apparatuses of the present invention have been described in terms of the above-illustrated embodiments, those skilled in the art will recognize that the various aspects of the present invention are not limited to the embodiments described. The present invention can be practiced with modification and alteration within the spirit and scope of the appended claims. The description is thus to be regarded as illustrative instead of restrictive on the present invention.

What is claimed is:

1. An apparatus, comprising:
   a light source;
   a first relay lens, disposed on a first optical path, optically coupled to the light source;
   a second relay lens, disposed on a second optical path, optically coupled to the first relay lens, the second optical path being substantially parallel to the first optical path; and
   a light management device, having
      a light entrance surface optically coupled to the second relay lens along the second optical path, and
      a light exit surface on a third optical path.

2. The apparatus of claim 1, wherein the third optical path is substantially parallel to the second optical path.

3. The apparatus of claim 1, wherein the light source comprises an arc lamp.

4. The apparatus of claim 3, wherein the arc lamp comprises a metal halide arc lamp.

5. The apparatus of claim 1, wherein the first relay lens comprises an off-center relay lens.

6. The apparatus of claim 1, wherein the second relay lens comprises an off-center relay lens.

7. The apparatus of claim 1, wherein the light management device further comprises at least one liquid crystal on silicon device.

8. A method comprising:
   providing light along a first optical path to a first relay lens;
   deflecting the light to a second relay lens;
   at the second relay lens, deflecting the deflected light on to a second optical path that is substantially parallel to the first optical path; and
   providing the deflected light along the second optical path to a light entrance surface of a light management device, and
   providing processed light from an exit surface of the light management device along a third optical path.

9. The method of claim 8, wherein the third optical path is substantially parallel to the second optical path.

10. The method of claim 8, further comprising:
    receiving the processed light with a projection lens optically coupled to the exit surface.

11. The method of claim 10, wherein said providing processed light from the exit surface comprises processing the light within the light management device.

12. The method of claim 11, wherein said processing the light within the light management device includes processing the light with one or more liquid crystal on silicon devices.

13. The method of claim 8, wherein said providing light comprises providing light from an arc lamp.

14. The method of claim 8, wherein said deflecting comprises focusing the light to the second relay lens.

15. The method of claim 8, wherein said deflecting the deflected light comprises focusing the deflected light on to the second optical path.

16. The method of claim 8, wherein said providing the deflected light comprises focusing the deflected light on the second optical path on to the light entrance surface.

17. A system comprising:

a light source;

a first relay lens, disposed on a first optical path, optically coupled to the light source;

a second relay lens, disposed on a second optical path, optically coupled to the first relay lens, the second optical path being substantially parallel to the first optical path;

a light management device, having
- a light entrance surface optically coupled to the second relay lens along the second optical path, and
- a light exit surface on a third optical path; and a projection lens optically coupled to the light exit surface of the light management device.

18. The system of claim 17, wherein the third optical path is substantially parallel to the second optical path.

19. The system of claim 17, wherein the light source comprises an arc lamp.

20. The system of claim 17, wherein the light management device further comprises at least one liquid crystal on silicon device.

* * * * *